J. P. NIKONOW.
STARTING MECHANISM FOR GAS ENGINES.
APPLICATION FILED OCT. 3, 1913.
1,235,046.
Patented July 31, 1917.
3 SHEETS—SHEET 1.
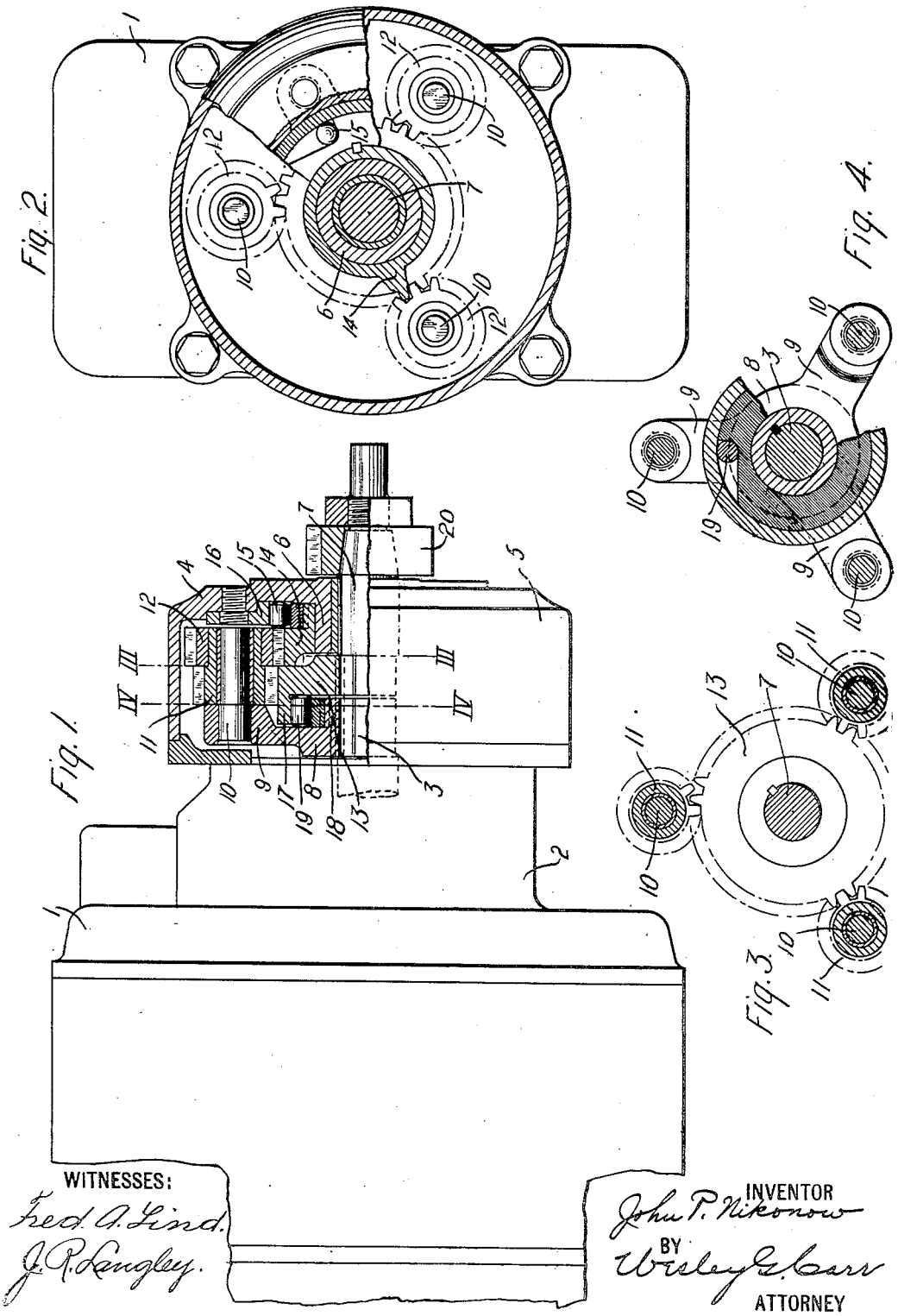
WITNESSES:
Fred A. Lind.
J. R. Langley.
INVENTOR
John P. Nikonow
BY
Wisley G. Carr
ATTORNEY J. P. NIKONOW.
STARTING MECHANISM FOR GAS ENGINES.
APPLICATION FILED OCT. 3, 1913.
1,235,046.
Patented July 31, 1917.
3 SHEETS—SHEET 2.
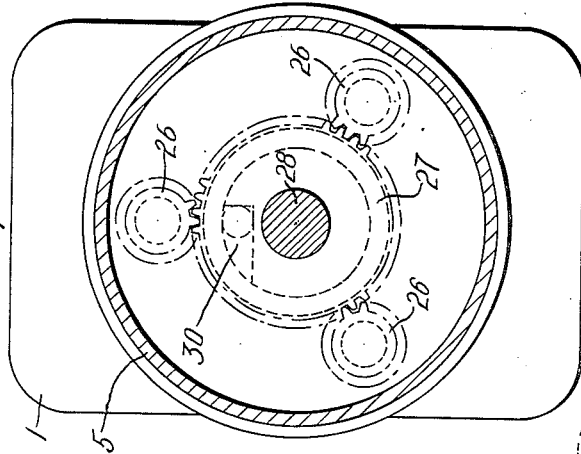
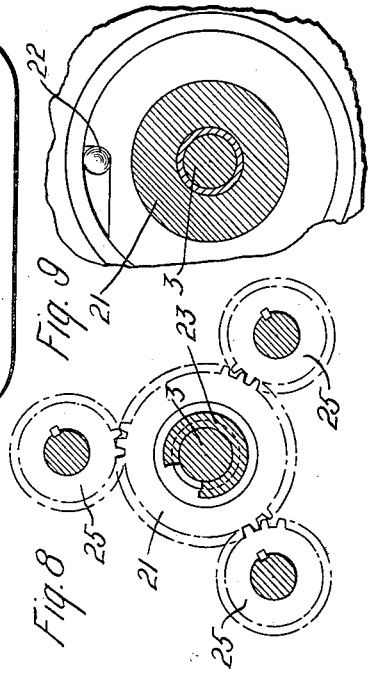
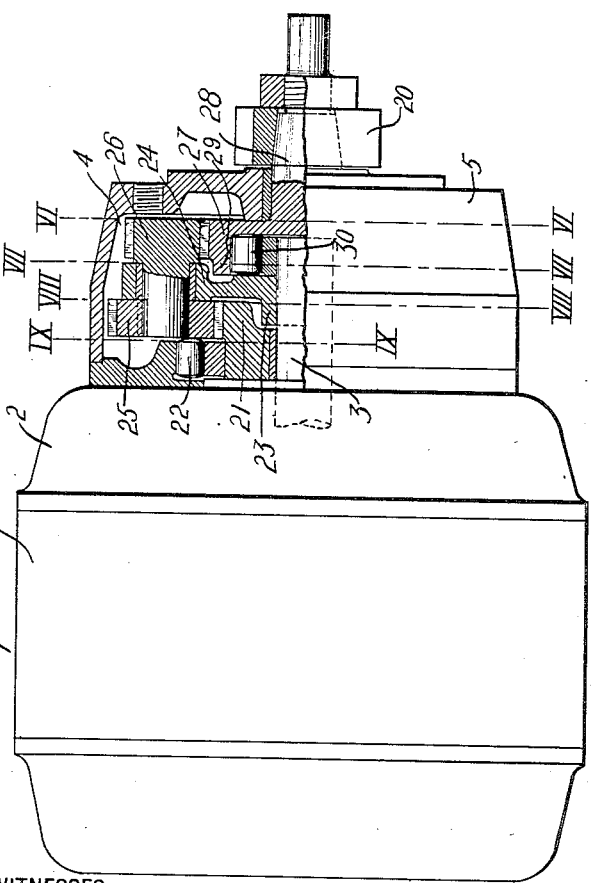
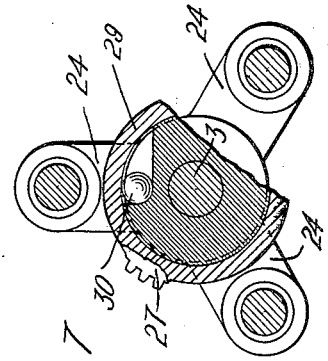
WITNESSES:
Fred. A. Lind.
J. R. Langley.
INVENTOR
John P. Nikonow
BY
Wesley G. Carr
ATTORNEY J. P. NIKONOW.
STARTING MECHANISM FOR GAS ENGINES.
APPLICATION FILED OCT. 3, 1913.
1,235,046.
Patented July 31, 1917.
3 SHEETS—SHEET 3.
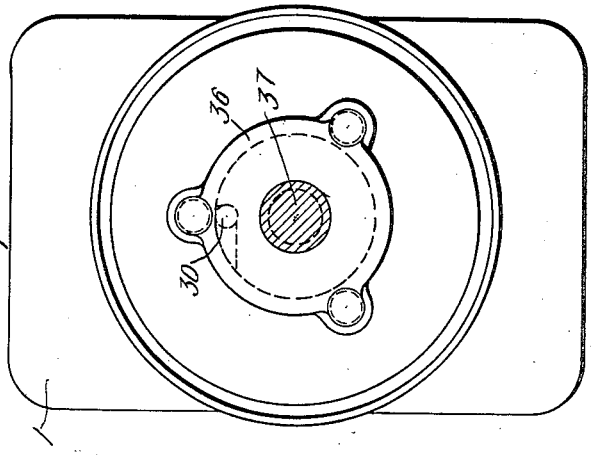
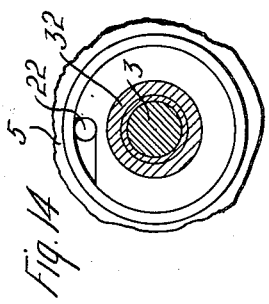
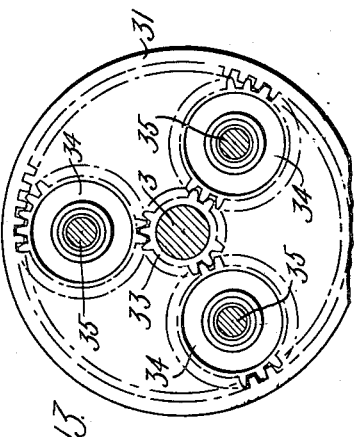
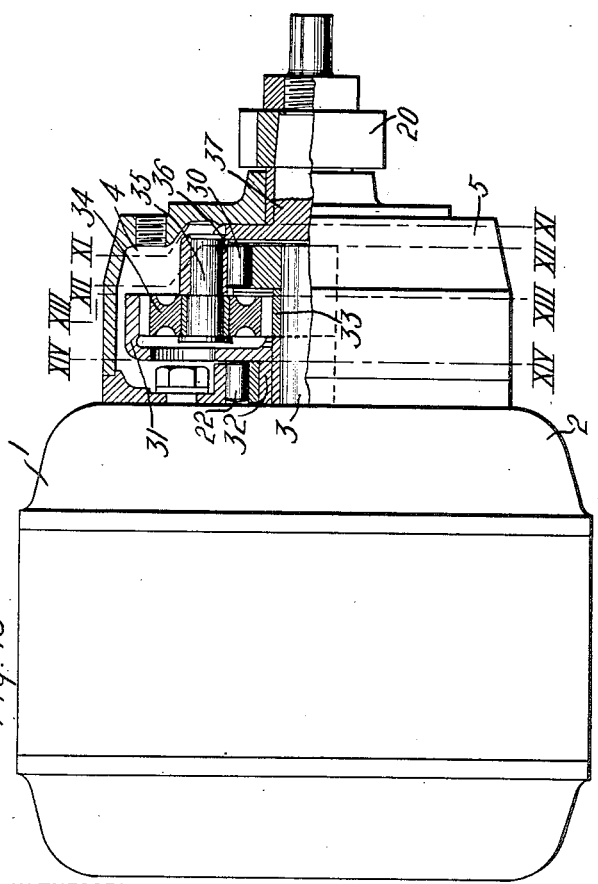
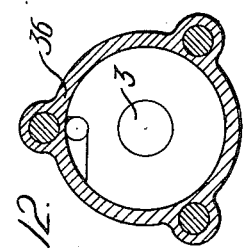
WITNESSES:
Fred. A. Lind.
J. R. Langley.
INVENTOR
John P. Nikonow
BY
Wesley S. Loan
ATTORNEY

UNITED STATES PATENT OFFICE.

JOHN P. NIKONOW, OF PITTSBURGH, PENNSYLVANIA, ASSIGNOR TO WESTINGHOUSE ELECTRIC AND MANUFACTURING COMPANY, A CORPORATION OF PENNSYLVANIA.

STARTING MECHANISM FOR GAS-ENGINES.

1,235,046. Specification of Letters Patent. Patented July 31, 1917.

Application filed October 3, 1913. Serial No. 793,092.

*To all whom it may concern:*

Be it known that I, JOHN P. NIKONOW, a subject of the Czar of Russia, and a resident of Pittsburgh, in the county of Allegheny and State of Pennsylvania, have invented a new and useful Improvement in Starting Mechanism for Gas-Engines, of which the following is a specification.

My invention relates to starting mechanism for gas engines and it has special reference to transmission mechanism which may be employed to operatively connect dynamo-electric machines to the shafts of gas engines.

My invention has for its object to provide a simple and compact arrangement of gear mechanism which automatically operates to transmit power at different speed ratios according to the direction in which the power is transmitted.

In the use of dynamo-electric machines which operate as motors to start the gas engines of automobiles, or other motor vehicles, and are then operated as generators to furnish current for ignition, lighting or charging, it is desirable to employ different speed ratios for the separate operations. It is possible, by means of this arrangement, to employ a small, high-speed dynamo-electric machine which operates through a relatively high-reduction gear mechanism to start a gas engine and which is operated as a generator at substantially engine speed.

I have provided a system of planetary gear mechanism, which is automatic in its operation, to change the speed ratio between the driving and the driven members when their functions are reversed. The mechanism is adapted to be placed in a small housing which is attached to, or may be a part of, the casing of the dynamo-electric machine. The small space required for this mechanism renders it possible for it to be assembled with the dynamo-electric machine.

In the accompanying drawings Figure 1 is a side view, partially in elevation and partially in section, of a dynamo-electric machine having my invention applied thereto. Fig. 2 is an end view of the same, partially in elevation and partially in section. Figs. 3 and 4 are sectional views on lines III—III and IV—IV, respectively, of Fig. 1. Fig. 5 is a view, similar to Fig. 1, of a modification. Figs. 6, 7, 8 and 9 are sectional views on lines VI—VI, VII—VII, VIII—VIII and IX—IX respectively, of Fig. 5. Fig. 10 is a view similar to Fig. 1, of a second modification. Figs. 11, 12, 13 and 14 are sectional views on lines XI—XI, XII—XII, XIII—XIII and XIV—XIV, respectively, of Fig. 10.

Referring particularly to Figs. 1, 2, 3 and 4, a dynamo-electric machine 1 is provided with a casing 2 and an armature shaft 3. A transmission mechanism 4, which surrounds the armature shaft 3, is inclosed within a casing or housing 5 that is attached, by any suitable means, to the casing 2. The housing 5 is provided with a flange portion 6 to form a bearing for a stub shaft 7 that is in axial alinement with the armature shaft 3.

The transmission mechanism comprises a collar member 8 that is fixed on the armature shaft 3 and is provided with radial arms 9 (Fig. 4) which support pins 10. Two pinions 11 and 12, which are fixed to each other, are rotatably mounted upon each of the pins 10. The pinions 11 are in mesh with a gear wheel 13 that is fixed to the shaft 7. The pinions 12, which are larger than the pinions 11, are in mesh with an annular gear wheel 14 that is rotatably mounted upon the flange 6. When the dynamo-electric machine operates as a motor, the gear wheel 14 is locked by means of a one-way roller clutch 15 to a ring member 16 that is fixed to the housing 5. The gear wheel 13 is provided with a flange portion 17 which surrounds a sleeve portion 18 of the collar 8 and is connected thereto, when the dynamo-electric machine is operated as a generator, by means of a one-way roller clutch 19.

The shaft 7 is provided with a pinion 20 for connection to any suitable rotatable part of a gas engine (not shown). The speed ratio between the armature shaft 3 and the shaft 7 may be varied, as desired, by arranging the relative members of teeth upon the several pinions and gear wheels. Preferably, the ratio employed for motor operation is approximately 20:1, while that for generator operation is approximately 1:1.

When current is applied to the motor through any suitable electrical connections, the armature shaft is rotated in a counter-clockwise direction (Fig. 4) and carries with it the collar member 8 and the pinions 11 and 12. The gear wheel 13, which is connected to the driven member, tends to remain stationary and thereby cause the pinions 11 and 12 to tend to rotate in a counter-clockwise direction upon the pins 10. Torque is consequently transmitted to the gear wheel 14 by the pinion 12, thus causing the gear wheel 14 to be locked to the casing 5 by the roller clutch 15.

The pinion 12 then rolls, in a counter-clockwise direction, upon the gear wheel 14 and, at the same time, revolves about the axis of the armature shaft 3. The pinion 11 rotates with the pinion 12 but, because of the greater ratio between the pinion 11 and the gear wheel 13 than that between the pinion 12 and the gear wheel 14, the gear wheel 13 is rotated in the same direction as the armature shaft but at a greatly reduced rate. The clutch 19 allows the collar member 8 to overrun the gear wheel 13.

When the engine starts under its own power, its speed exceeds that at which the shaft 7 is driven by the dynamo-electric machine, and the shaft 7 then becomes the driving member. The flange 17 of the gear wheel 13 tends to overrun the sleeve 18 of the collar 8, whereupon these members are locked together by the roller clutch 19, thus directly connecting the shafts 7 and 3. No torque is then applied to the pinions 11 and 12, the gear wheel 13 being locked against movement relative to the arms 9 and the pinions 11 and 12. The clutch 15 releases the gear wheel 14, and the whole system revolves, as a unit, about the axis of the armature shaft. The dynamo-electric machine is then driven, as a generator, at substantially engine speed.

A modification is shown in Figs. 5, 6, 7, 8 and 9 in which like numerals designate corresponding parts. A gear wheel 21 is rotatably mounted upon the armature shaft 3 and is adapted to be locked to the housing 5 by a one-way roller clutch 22 when the armature shaft 3 is the driving member. A sleeve member 23, which is fixed to the armature shaft 3, is provided with radial arms 24, at the outer ends of which, pinions 25 and 26 are rotatably mounted. The pinions 25 mesh with the gear wheel 21 and the pinions 26 mesh with a gear wheel 27 that is integral with a shaft 28. The gear wheel 27 is provided with an annular flange 29, which is adapted to be connected to the armature shaft 3 by means of a one-way roller clutch 30 when the shaft 28 becomes the driving member. The shaft 28 is provided with a pinion 20 to engage any suitable rotatable part of a gas engine (not shown).

When the armature shaft 3 is the driving member, the sleeve member 23 is rotated in a counter-clockwise direction (Fig. 8), and the pinions 25 and 26 are thus caused to revolve around the axis of the armature shaft. The shaft 28, which is connected to the engine shaft to be rotated, tends to remain stationary, and the pinions 26 and 25 are caused to rotate in a counter-clockwise direction about their common axis. A torque is thereby transmitted to the gear wheel 21 that tends to rotate it in a clockwise direction, whereupon it is locked to the housing 5 by the clutch 22. The pinions 25 then revolve about the stationary gear wheel 21 and, at the same time, roll upon it to rotate the pinions 26 and the gear wheel 27. Because of the speed reduction between the gear wheels 21 and 27, the gear wheel 27 is rotated in a counter-clockwise direction by the pinion 26 but at a greatly reduced rate. It will be noted that the angular movement of the axis of the pinions 26, tending to rotate the gear wheel 27 in a counter-clockwise direction, is, for the greater part, neutralized by the rotation of the pinions 26 upon their axis. The latter movement of the pinions 26 would, of itself, cause the gear wheel 27 to rotate in a clockwise direction, and the actual movement of the gear wheel 27 is the resultant sum of these separate movements. The clutch 30 permits the armature shaft 3 to overrun the gear wheel 27 during the operation of the reduction gear mechanism.

When the shaft 28 becomes the driving member, the clutch 30 locks the flange 29 to the armature shaft 3 and they rotate at the same speed. No torque is applied to the pinions 25 and 26, but they are locked against movement relative to the gear wheel 27. The result is to revolve the entire system as a unit in a counter-clockwise direction, the roller clutch 22 permitting the gear wheel 21 to rotate relatively to the housing 5.

A further modification is illustrated in Figs. 10, 11, 12, 13 and 14 in which like numerals designate corresponding parts. An internal gear wheel 31, which is rotatably mounted upon the armature shaft 3, is provided with a sleeve portion 32 that is adapted to be locked to the housing 5 by means of a one-way roller clutch 22 when the armature shaft is the driving member. The armature shaft is provided with a pinion 33 that is operatively connected to the gear wheel 31, by means of pinions 34, the pinions 34 are rotatably mounted upon pins 35 that are carried by the flange portion 36 of a shaft 37. A one-way roller clutch 30 is adapted to connect the flange 36 to the armature shaft 3 when the shaft 37 is the driving member and to allow the armature shaft 3 to overrun the flange 36 when the armature shaft is the driving member.

When the armature shaft 3 is the driving member, it rotates in a counter-clockwise direction (Fig. 4), and torque is transmitted, by means of the pinions 33 and 34, to the gear wheel 31, tending to rotate it in a clockwise direction (Fig. 4). The roller clutch 22 thereupon locks the sleeve 32 of the internal gear wheel 31 to the housing 5. The pinions 34 then roll upon the gear wheel 31 and thus rotate the shaft 37 by means of the pins 35 and the flange 36. The roller clutch 30 permits the armature shaft to overrun the flange 36 of the shaft 37.

When the shaft 37 becomes the driver, the clutch 30 connects the shafts 37 and 3, and they rotate together to operate the dynamo-electric machine as a generator, at substantially engine speed. As in the constructions above described, the clutch 22 releases the gear wheel 31, and the entire system revolves as a unit.

While I have shown and described my invention in connection with a dynamo-electric machine, it will be understood that it may be applied equally as well to any other machine which operates as a motor and also to store energy as, for example, motor pumps which are operated by means of fluid pressure.

I claim as my invention:

1. In a transmission mechanism, the combination with a driving member and a driven member, of a gear wheel rotatably mounted on one of said members, a stationary element, a one-way clutch for locking said gear wheel to said stationary element, means comprising a pinion connected to one of said members for operatively connecting said gear wheel to said driven member, and automatic means for directly connecting said driving member to the other of said members when the driven member becomes the driver.

2. In a motor-generator, the combination of an armature, a shaft adapted to be driven by the armature, a gear on the shaft, planetary gearing carried by the armature in engagement with the gear on the shaft, and clutch controlled means for causing the gears to operate differentially to drive the shaft.

3. In a motor-generator, the combination of an armature, a shaft, a gear on the shaft, pinions carried by the armature in engagement with the gear on the shaft, gears rotatable with said pinions, a gear in engagement with said gears and supported concentrically with the shaft, and a clutch operating to hold said gear against turning in one direction and adapted to permit the free turning thereon in the opposite direction.

4. In a motor-generator, the combination of an armature, a shaft supported concentrically with the armature, a gear on the shaft, a pair of pinions carried by the armature, said pinions being connected to turn together and one of said pinions being in engagement with the gear on the shaft, a gear loose upon the shaft in engagement with the other of said pair of pinions, a clutch for holding said gear against turning in one direction and adapted to permit the free turning thereof in the opposite direction, and a second clutch for directly connecting said shaft to said armature and operating to connect the armature and shaft when the shaft is turned to drive the armature.

5. In a transmission mechanism, the combination with a driving and a driven member, of a gear wheel rotatably mounted on said driven member, a stationary element, a one-way clutch for locking said gear wheel to said stationary element, means comprising a pinion connected to the driving member for operatively connecting the gear wheel to the driving member, and automatic means for directly connecting said members when the driven member becomes the driving member.

In testimony whereof, I have hereunto subscribed my name this 29th day of Sept., 1913.

JOHN P. NIKONOW.

Witnesses:
H. T. GEORGE,
B. B. HINES.

It is hereby certified that in Letters Patent No. 1,235,046, granted July 31, 1917, upon the application of John P. Nikonow, of Pittsburgh, Pennsylvania, for an improvement in "Starting Mechanism for Gas-Engines," errors appear in the printed specification requiring correction as follows: Page 3, line 34, claim 1 for the words "said driven member" read *the other of said members;* same page and claim, lines 36-37, for the words "the other of said members" read *said driven member;* and that the said Letters Patent should be read with these corrections therein that the same may conform to the record of the case in the Patent Office Signed and sealed this 4th day of September, A. D., 1917

[SEAL.]

R. F. WHITEHEAD,
*Acting Commissioner of Patents.*

Cl. 74—34.